US011500910B2

(12) United States Patent
Dash et al.

(10) Patent No.: US 11,500,910 B2
(45) Date of Patent: Nov. 15, 2022

(54) SIMILARITY BASED NEGATIVE SAMPLING ANALYSIS

(71) Applicant: International Business Machines Corporation, Armonk, NY (US)

(72) Inventors: Sarthak Dash, Jersey City, NJ (US); Alfio Massimiliano Gliozzo, Brooklyn, NY (US); Michael Robert Glass, Bayonne, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1170 days.

(21) Appl. No.: 15/927,359

(22) Filed: Mar. 21, 2018

(65) Prior Publication Data

US 2019/0294694 A1 Sep. 26, 2019

(51) Int. Cl.
| | | |
|---|---|---|
| *G06N 5/02* | (2006.01) | |
| *G06F 16/33* | (2019.01) | |
| *G06F 17/18* | (2006.01) | |
| *G06N 20/00* | (2019.01) | |
| *G06F 16/28* | (2019.01) | |

(52) U.S. Cl.
CPC ........ *G06F 16/3347* (2019.01); *G06F 16/288* (2019.01); *G06F 17/18* (2013.01); *G06N 5/022* (2013.01); *G06N 20/00* (2019.01)

(58) Field of Classification Search
CPC .... G06F 16/3347; G06F 16/288; G06F 17/18; G06N 20/00; G06N 5/022
See application file for complete search history.

(56) References Cited

U.S. PATENT DOCUMENTS

| | | | |
|---|---|---|---|
| 7,490,085 B2 | 2/2009 | Walker et al. | |
| 9,135,240 B2 | 9/2015 | Gliozzo | |
| 9,785,887 B2 | 10/2017 | Bornea et al. | |
| 2016/0179945 A1* | 6/2016 | Lastra Diaz | ........ G06F 16/3334 707/739 |
| 2017/0011289 A1 | 6/2017 | Gao et al. | |

(Continued)

OTHER PUBLICATIONS

Li, et al., Mining Negative Relevance Feedback for Information Filtering, 2009 IEEE/WIC/ACM International Conference on Web Intelligence and Intelligent Agent Technology, 2009, pp. 606-613.

(Continued)

*Primary Examiner* — Casey R. Garner
(74) *Attorney, Agent, or Firm* — Amin, Turocy & Watson, LLP

(57) ABSTRACT

Techniques regarding similarity based negative sample analysis are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a similarity component that can determine similarity metrics for respective entities based on a vector space model. The respective entities can be represented by a dataset. Also, the computer executable components can comprise a sampling component that can perform a negative sampling analysis on the dataset based on the similarity metrics.

20 Claims, 10 Drawing Sheets

(56) References Cited

U.S. PATENT DOCUMENTS

| | | | |
|---|---|---|---|
| 2017/0193390 A1* | 7/2017 | Weston | G06N 3/08 |
| 2018/0025008 A1* | 1/2018 | Tan | G06F 16/3331 |
| | | | 707/737 |
| 2021/0117802 A1* | 4/2021 | Nguyen | G06N 3/082 |
| 2021/0240682 A1* | 8/2021 | Osesina | G06N 20/00 |

OTHER PUBLICATIONS

Wei, et al., Large-scale Knowledge Base Completion: Inferring via Grounding Network Sampling over Selected Instances, CIKM '15 Proceedings of the 24th ACM International on Conference on Information and Knowledge Management, Oct. 19, 2015, pp. 1331-1340.

Xu, et al, Tag-Aware Personalized Recommendation Using a Deep-Semantic Similarity Model with Negative Sampling, CIKM '16 Proceedings of the 25th ACM International on Conference on Information and Knowledge Management, Pages Oct. 24, 2016, 1921-1924.

Kanojia, et al., Enhancing Knowledge Graph Embedding with Probabilistic Negative Sampling, WWW '17 Companion Proceedings of the 26th International Conference on World Wide Web Companion, Apr. 3, 2017, pp. 801-802.

Manotumruksa, et al., A Personalised Ranking Framework with Multiple Sampling Criteria for Venue Recommendation, CIKM '17 Proceedings of the 2017 ACM on Conference on Information and Knowledge Management, Nov. 6, 2107, pp. 1469-1478.

Nickel, et al., A review of relational machine learning for knowledge graphs, Proceedings of the IEEE, Jan. 2016, pp. 11-33, vol. 104, No. 1.

Kotnis, et al., Analysis of the Impact of Negative Sampling on Link Prediction in Knowledge Graphs, Aug. 22, 2017,14 Pages.

Auer, et al., Dbpedia: A nucleus for a web of open data, The semantic web, 2007, 14 Pages.

Bollacker, et al., Freebase: a collaboratively created graph database for structuring human knowledge, Proceedings of the 2008 ACM SIGMOD International Conference on Management of data, Jun. 9, 2008, pp. 1247-1250.

Bordes, et al., Learning Structured Embeddings of Knowledge Bases, Proceedings of the Twenty-Fifth AAAI Conference on Artificial Intelligence, 2011, pp. 301-306.

Bordes, et al., Translating Embeddings for Modeling Multi-relational Data, In Advances in neural information processing systems, 2013, 9 Pages.

Chawla, et al., Editorial: Special Issue on Learning from Imbalanced Data Sets, ACM Sigkdd Explorations Newsletter, 2004, pp. 1-6, vol. 6, No. 1.

Dong, et al., Knowledge Vault: A Web-Scale Approach to Probabilistic Knowledge Fusion, In Proceedings of the 20th ACM SIGKDD international conference on Knowledge discovery and data mining, 2014, 10 Pages.

Harris, Distributional Structure, Word, 1954, pp. 146-162, vol. 10:2-3.

Kingma, et al., Adam: A method for stochastic optimization, ICLR 2015, Jan. 30, 2017, 15 Pages.

Lin, et al., Modeling Relation Paths for Representation Learning of Knowledge Bases, Proceedings of the 2015 Conference on Empirical Methods in Natural Language Processing, Sep. 17, 2015, pp. 705-714.

Nickel, et al., A Three-Way Model for Collective Learning on Multi-Relational Data, Proceedings of the 28th International Conference on Machine Learning, 2011, 8 Pages.

Nickel, et al., Holographic Embeddings of Knowledge Graphs, Proceedings of the Thirtieth AAAI Conference on Artificial Intelligence, 2016, pp. 1955-1961.

Shi, et al., ProjE: Embedding Projection for Knowledge Graph Completion, Proceedings of the Thirty-First AAAI Conference on Artificial Intelligence, 2017, pp. 1236-1242.

Socher, et al., Reasoning With Neural Tensor Networks for Knowledge Base Completion, Advances in neural information processing systems, 2013, 10 Pages.

Toutanova, et al., Observed versus latent features for knowledge base and text inference, Proceedings of the 3rd Workshop on Continuous Vector Space Models and their Compositionality, Jul. 26, 2015, pp. 57-66.

Trouillon, et al., Complex Embeddings for Simple Link Prediction, Proceedings of the 33rd International Conference on Machine Learning, 2016, 10 Pages.

Wang, et al., Knowledge Graph Embedding by Translating on Hyperplanes, Proceedings of the Twenty-Eighth AAAI Conference on Artificial Intelligence, 2014, pp. 1112-1119.

Mel, et al., The NIST Definition of Cloud Computing, National Institute of Standards and Technology Special Publication 800-145, Sep. 2011, 7 Pages.

* cited by examiner

FIG. 6A

| Dataset | FB15K | FB15KSelected |
|---|---|---|
| #Train | 483,152 | 272,115 |
| #Valid | 50,000 | 17,535 |
| #Test | 59,071 | 20,466 |
| #Entities | 14,951 | 14,951 |
| #Relations | 1,357 | 237 |

FIG. 6B

| | FB15k | | FB15KSelected | |
|---|---|---|---|---|
| Algorithm | MRR[%] | Hits@10[%] | MRR[%] | Hits@10[%] |
| RESCAL | 35.4 | 58.7 | 22.6 | 34.4 |
| RESCAL* | 38.8 | 60.3 | 27.5 | 44.1 |
| ProjE_ptwise | 80.8 | 86.6 | 79.7 | 87.8 |
| ProjE_ptwise* | 81.7 | 90.0 | 80.7 | 88.4 |
| ProjE_wlistwise | 83.5 | 88.4 | 81.7 | 91.8 |
| ProjE_wlistwise* | 86.1 | 94.4 | 85.1 | 93.6 |

FIG. 6C

| EPOCH 1 | EPOCH 3 | EPOCH 5 | EPOCH 10 | EPOCH 90 |
|---|---|---|---|---|
| English(0.3965) | VHS(0.4616) | Blu-ray Disc(0.5647) | Blu-ray Disc(0.5451) | Blu-ray Disc(0.4147) |
| US Dollar(0.3736) | Blu-ray Disc(0.4528) | VHS(0.5044) | VHS(0.5337) | VHS(0.3449) |
| Blu-ray Disc(0.3580) | French(0.3407) | video(0.3313) | video(0.3635) | video(0.2717) |
| executive producer(0.2922) | English(0.3242) | Silent Hill(0.2475) | English(0.2320) | television(0.1798) |
| French(0.2812) | US Dollar(0.3219) | Luther(0.2314) | television(0.2273) | Kid Rock(0.1448) |

|  | FB15K Hits@1[%] | FB15kSelected Hits @1[%] |
|---|---|---|
| RESCAL | 23.5 | 16.3 |
| RESCAL* | 27.5 | 19.2 |
| ProjE_ptwise | 76.4 | 75 |
| ProjE_ptwise* | 76.8 | 76.2 |
| ProjE_wlistwise | 78 | 75.9 |
| ProjE_wlistwise* | 81.1 | 80 |

FIG. 7A

|  | Time (Epochs) | % reduction |
|---|---|---|
| RESCAL | 495 min (200 epochs) |  |
| RESCAL* | 440 min (60 epochs) | 11.1 |
| ProjE_ptwise | 832 min (99 epochs) |  |
| ProjE_ptwise* | 872 min (70 epochs) | -4.8 |
| ProjE_wlistwise | 726 min (92 epochs) |  |
| ProjE_wlistwise* | 225 min (28 epochs) | 69.0 |

DETERMINING, BY A SYSTEM OPERATIVELY COUPLED TO A PROCESSOR, SIMILARITY METRICS FOR RESPECTIVE ENTITIES BASED ON A VECTOR SPACE MODEL, WHEREIN THE RESPECTIVE ENTITIES ARE REPRESENTED BY A DATASET — 802

PERFORMING, BY THE SYSTEM, A NEGATIVE SAMPLING ANALYSIS ON THE DATASET BASED ON THE SIMILARITY METRICS — 804

SIMILARITY BASED NEGATIVE SAMPLING ANALYSIS

TECHNICAL FIELD

The subject disclosure relates to one or more negative sampling techniques, and more specifically, to one or more negative sampling techniques that are based on one or more similarity metrics to facilitate a machine learning task such as knowledge base completion.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can regard similarity based negative sampling analyses are described.

According to an embodiment, a system is provided. The system can comprise a memory that can store computer executable components. Further, the system can comprise a processor, operably coupled to the memory, and that can execute the computer executable components stored in the memory. The computer executable components can comprise a similarity component that can determine similarity metrics for respective entities based on a vector space model. The respective entities can be represented by a dataset. Also, the computer executable components can comprise a sampling component that can perform a negative sampling analysis on the dataset based on the similarity metrics.

According to another embodiment, a computer-implemented method is provided. The computer-implemented method can comprise determining, by a system operatively coupled to a processor, similarity metrics for respective entities based on a vector space model. The respective entities can be represented by a dataset. The computer-implemented method can also comprise performing, by the system, a negative sampling analysis on the dataset based on the similarity metrics.

According to another embodiment, a computer program product for similarity based negative sampling is provided. The computer program product can comprise comprising a computer readable storage medium having program instructions embodied therewith. The program instructions can be executable by a processor to cause the processor to determine, by a system operatively coupled to the processor, similarity metrics for respective entities based on a vector space model. The respective entities can be represented by a dataset. Also, the computer executable components can cause the processor to perform, by the system, a negative sampling analysis on the dataset based on the similarity metrics.

BRIEF DESCRIPTION OF THE DRAWINGS

FIG. 6A illustrates a diagram of an example, non-limiting table that can demonstrate the efficacy and/or efficiency of one or more similarity based negative sampling analyses in accordance with one or more embodiments described herein.

FIG. 6B illustrates a diagram of an example, non-limiting table that can demonstrate the efficacy and/or efficiency of one or more similarity based negative sampling analyses in accordance with one or more embodiments described herein.

FIG. 6C illustrates a diagram of an example, non-limiting table that can demonstrate the efficacy and/or efficiency of one or more similarity based negative sampling analyses in accordance with one or more embodiments described herein.

FIG. 7A illustrates a diagram of an example, non-limiting table that can demonstrate the efficacy and/or efficiency of one or more similarity based negative sampling analyses in accordance with one or more embodiments described herein.

FIG. 7B illustrates a diagram of an example, non-limiting table that can demonstrate the efficacy and/or efficiency of one or more similarity based negative sampling analyses in accordance with one or more embodiments described herein.

FIG. 8 illustrates a flow diagram of an example, non-limiting method that can facilitate one or more similarity based negative sampling analyses in accordance with one or more embodiments described herein.

DETAILED DESCRIPTION

Figure 1:
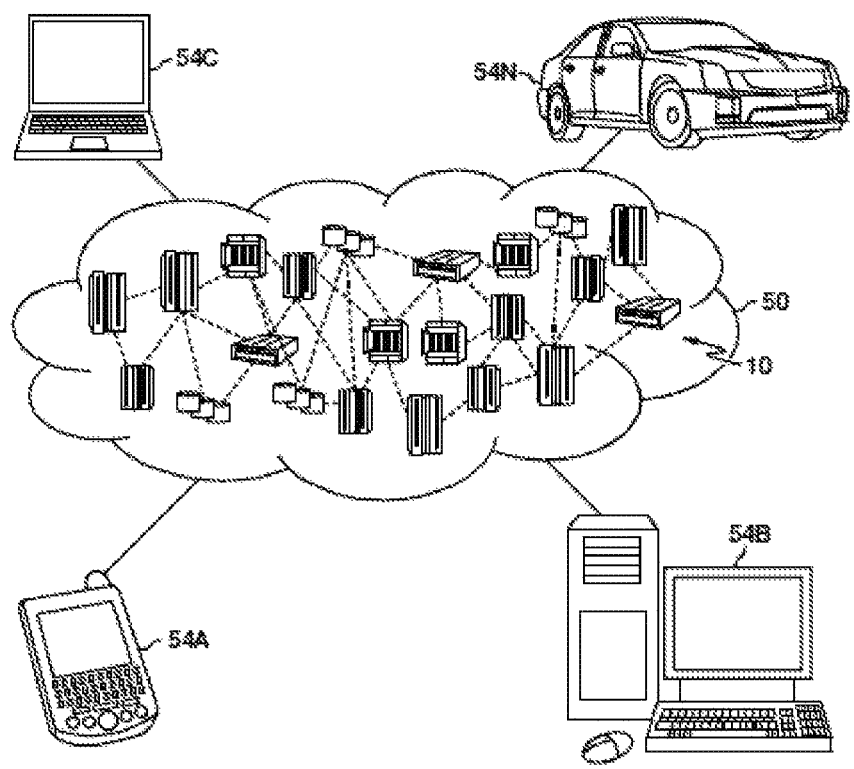
FIG. 1 depicts a cloud computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
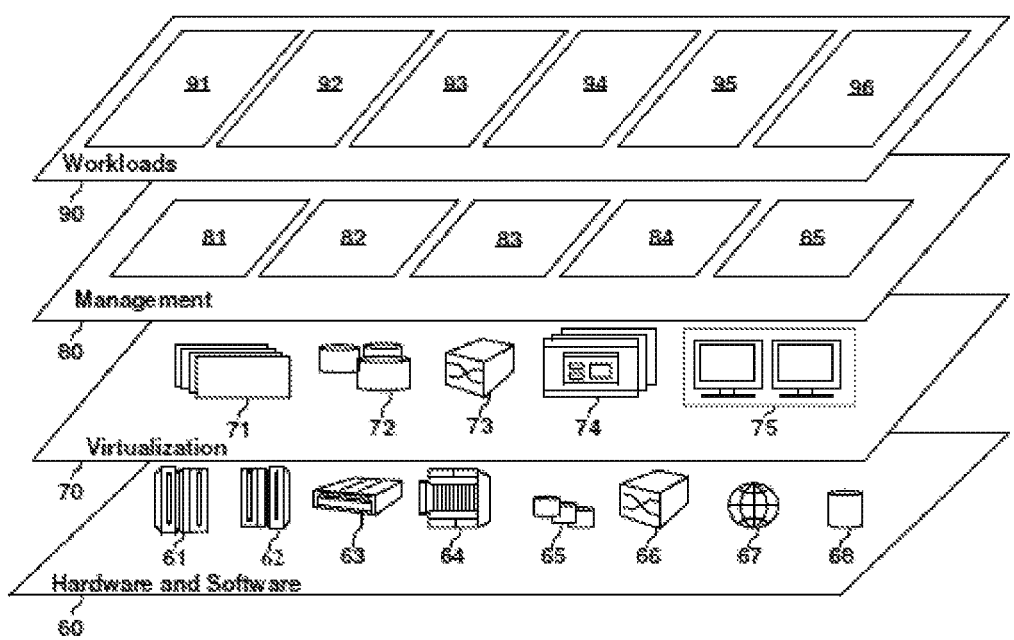
FIG. 2 depicts abstraction model layers in accordance with one or more embodiments described herein.

Referring now to FIG. 2, a set of functional abstraction layers provided by cloud computing environment 50 (FIG. 1) is shown. Repetitive description of like elements employed in other embodiments described herein is omitted for sake of brevity. It should be understood in advance that the components, layers, and functions shown in FIG. 2 are intended to be illustrative only and embodiments of the invention are not limited thereto. As depicted, the following layers and corresponding functions are provided. Repetitive description of like elements employed in other embodiments described herein is omitted for sake of brevity.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and similarity based negative sampling analysis 96. Various embodiments of the present invention can utilize the cloud computing environment described with reference to FIGS. 1 and 2 to facilitate one or more and similarity based negative sampling analyses.

Knowledge base completion ("KBC") can be a form of prolog style reasoning that can comprise predicting whether a query assertion regarding a subject knowledge base ("KB") is true or false. Additionally, given an entity and a relation pertaining to an assertion, a sub-task of KBC, typically referred to as "link prediction," can aim to predict a correct second entity that renders the subject assertion plausible. Typical techniques to facilitate KBC can exploit deep neural nets trained with both false and true assertions; wherein true assertions can be taken directly from a subject KB, and false assertions can be generated by a random negative sampling analysis. Further, random negative sampling analyses can comprise randomly corrupting the KB to generate negative samples, which can be used as false assertions to train one or more machine learning technologies.

For example, the KB can comprise a plurality of triples, each of which can comprise two entities and a relation between said entities. Random negative sampling can randomly replace an entity and/or relation of one triple with a random entity and/or relation of another, randomly chosen triple to generate the negative sample. Due to the random nature inherent in generation of the negative sample, typical random negative sampling analyses can be highly likely to generate nonsensical negative samples that are ill-suited to be utilized as training data. For instance, a negative sample can be nonsensical due to the replacement of a first type of entity with a second type of entity, wherein the second type of entity is not compatible with the context established by the relation of the subject triple. Thus, the occurrence of various types of entities within a KB can be one of various factors that contribute to the generation of nonsensical negative samples by typical random negative sampling analyses.

Various embodiments of the present invention can be directed to computer processing systems, computer-implemented methods, apparatus and/or computer program products that can facilitate the efficient, effective, and autonomous (e.g., without direct human guidance) negative sampling of a KB based on one or more determined similarity metrics. One or more embodiments described herein can regard generating one or more meaningful negative samples without necessitating domain constraints, range constraints, and/or type assignments to entities comprising the subject KB. For instance, various embodiments described herein can utilize an incremental approach to understand the meaning of entities through their distributional similarity.

For example, one or more embodiments described herein can regard one or more similarity based negative sampling analyses based on one or more similarity metrics that can characterize one or more entities comprised within a dataset (e.g., a KB). Further, the one or more similarity metrics can be defined via, for example, a vector space model. The one or more similarity based negative sampling analyses described herein can generate one or more negative samples that are similar to true assertions, but are nevertheless false assertions. In other words, the one or more generated negative samples can be characterized as plausible false assertions. Therefore, the one or more similarity based negative sampling analyses can facilitate training one or more machine learning technologies to delineate between true and false assertions comprising the same type of entities in addition to true and false assertions comprising different types of entities.

The computer processing systems, computer-implemented methods, apparatus and/or computer program products employ hardware and/or software to solve problems that are highly technical in nature (e.g., performing one or more similarity based negative sampling analyses to facilitate a KBC task), that are not abstract and cannot be performed as a set of mental acts by a human. For example, a human, and/or a plethora of humans, cannot readily analyze and/or corrupt the volume of assertions that can be analyzed by the one or more similarity based negative sampling analyses performed by various embodiments described herein with the same level of efficiency, speed, and/or accuracy. Further, the autonomous nature of the various embodiments described herein facilitate a primary purpose of machine learning technologies (e.g., to alleviate the need for human intervention).

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 3:
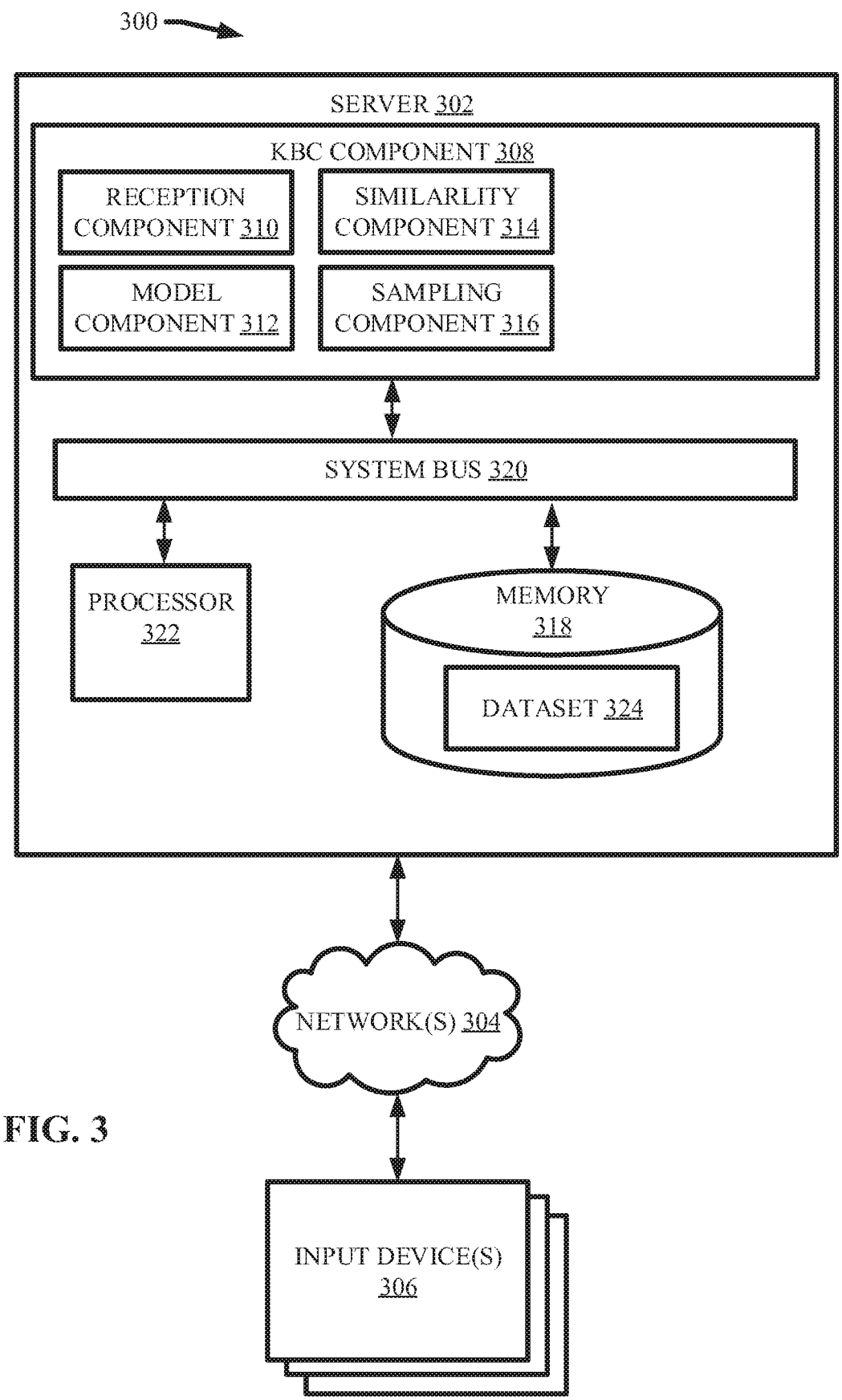
FIG. 3 illustrates a block diagram of an example, non-limiting system that can facilitate one or more similarity based negative sampling analyses in accordance with one or more embodiments described herein.

FIG. 3 illustrates a block diagram of an example, non-limiting system 300 that can facilitate one or more similarity negative sampling analyses in accordance with one or more embodiments described herein. Repetitive description of like elements employed in other embodiments described herein is omitted for sake of brevity. Aspects of systems (e.g., system 300 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 3, the system 300 can comprise one or more servers 302, one or more networks 304, and/or one or more input devices 306. The server 302 can comprise knowledge base completion ("KBC") component 308. The KBC component 308 can further comprise reception component 310, model component 312, similarity component 314, and/or sampling component 316. Also, the server 302 can comprise or otherwise be associated with at least one memory 318 (e.g., located in the server 302 and/or the cloud computing environment 50). The server 302 can further comprise a system bus 320 that can couple to various components such as, but not limited to, the KBC component 308 and associated components, memory 318 and/or a processor 322. While a server 302 is illustrated in FIG. 3, in other embodiments, multiple devices of various types can be associated with or comprise the features shown in FIG. 3. Further, the server 302 can communicate with the cloud computing environment 50 depicted in FIGS. 1 and 2 via the one or more networks 304.

The one or more networks 304 can comprise wired and wireless networks, including, but not limited to, a cellular network, a wide area network (WAN) (e.g., the Internet) or a local area network (LAN). For example, the server 302 can communicate with the one or more input devices 306 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the KBC component 308 can be provided on the one or more servers 302, it should be appreciated that the architecture of system 300 is not so limited. For example, the KBC component 308, or one or more components of KBC component 308, can be located at another computer device, such as another server device, a client device, etc.

The one or more input devices 306 can comprise one or more computerized devices, which can include, but are not limited to: personal computers, desktop computers 54B, laptop computers 54C, cellular telephones 54A (e.g., smart phones), computerized tablets (e.g., comprising a processor), smart watches, keyboards, touch screens, mice, a combination thereof, and/or the like. A user of the system 300 can utilize the one or more input devices 306 to input data into the system 300, thereby sharing (e.g., via a direct connection and/or via the one or more networks 304) said data with the server 302. For example, the one or more input devices 306 can send data to the reception component 310 (e.g., via a direct connection and/or via the one or more networks 304). Additionally, the one or more input devices 306 can comprise one or more displays that can present one or more outputs generated by the system 300 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In one or more embodiments, the KBC component 308 can analyze data via one or more similarity based negative sampling analyses to facilitate training one or more machine learning technologies. As used herein, the term "machine learning technologies" can refer to an application of artificial intelligence technologies to automatically learn and/or improve from an experience (e.g., training data) without explicit programming of the lesson learned and/or improved. The subject data can be entered into the system 300 by a user via the one or more input devices and/or the subject data can be comprised within a dataset 324, wherein the dataset 324 can be located in the memory 318 and/or in another location in a cloud computing environment 50 (e.g., accessible via the one or more networks 304). In one or more embodiments, the data (e.g., the dataset 324) can represent one or more assertions in a knowledge base ("KB"). Also, the one or more assertions can comprise one or more entities and one or more relations, which can describe how the one or more entities relate to each other. For example, each assertion comprising the KB can comprise an object entity, a subject entity, and/or a relation. For instance, wherein an example assertion is "located in (New York City, N.Y.)," the term "New York City" can be the subject entity, the term "New York" can be the object entity, and/or the term "located in" can be the relation. The example assertion can delineate that New York City is located in New York.

Further, the KB can comprise entities and/or relations of various types. For instance, in the example assertion, the object entity "New York" can be a location type of entity. The KB can comprise one or more additional example assertions having other location type entities such as "California," "USA" and/or "Canada." Additionally, the KB can comprise one or more additional example assertions having a different type of entity, such as, for example, a pigment type of entity. An example assertion comprising a pigment type of entity can be, for example, "located in (New York City, Blue)," which can regard a pigment designation of New York City on a map. Further, the KB can comprise one or more additional example assertions having a different type of relation, such as for example "capital city (Albany, N.Y.)." One of ordinary skill in the art will recognize that the KB can comprise a plethora of entities and/or relations of various types in numerous combinations, thereby forming a multitude of assertions.

In various embodiments, the reception component 310 can receive the data entered by a user of the system 300 via the one or more input devices 306. The reception component 310 can be operatively coupled to the one or more input devices 306 directly (e.g., via an electrical connection) or indirectly (e.g., via the one or more networks 304). Additionally, the reception component 310 can be operatively coupled to one or more components of the server 302 (e.g., one or more component associated with the KBC component 308, system bus 320, processor 322, and/or memory 318) directly (e.g., via an electrical connection) or indirectly (e.g., via the one or more networks 304).

The model component 312 can generate one or more vector space models and/or populate (e.g., using one or more deep learning algorithms) the one or more vector space models with estimated vectors associated with each assertion comprising a subject KB. For example, the model component 312 can estimate a vector for each respective entity (e.g., subject entities and/or object entities) represented by the KB. As represented by the KB, two subject entities of the same type can share common relations with which they associate to other entities. Therefore, assertions having the two entities as object entities (e.g., or subject entities) can have similar distributions amongst relation-subject entity (e.g., or relation-object entity) pairs, and thus similar contexts. Since the entities, of the same type, can likely have similar contexts (e.g., are distributionally similar), their estimated vectors can be populated close to one another within the one or more vector space models. Additionally, the converse can also hold true. In other words, if two or more entities have estimated vectors that are close to each other in the one or more vector space models, then the entities can likely be characterized by similar contexts and high distributional similarity.

Based on the one or more vector space models, the similarity component 314 can determine similarity metrics for each estimated vector respective of the other estimated vectors. For example, the similarity component 314 can determine similarity metrics for each entity and/or relation respective of each other entity and/or relation represented by the KB (e.g., dataset 324). The one or more similarity metrics can utilize any similarity technique that can be defined by the one or more vector space models. Example similarity metrics can include, but are not limited to: a cosine metric, an euclidean metric, a manhattan metric, and/or the like (e.g., a similarity metric that depends upon inverse of the distance between entities in an existing ontology). For example, in various embodiments, the similarity component 314 can determine cosine metrics (e.g., cosine-similarity) between unit-normalized vectors of respective entities and/or relations with respect to each other based on the one or more vector space models, wherein the cosine metrics can define a measure of distributional similarity within the KB. For instance, for each assertion, an entity (e.g., the subject entity and/or the object entity) can be extracted and cosine-similarity can be utilized by the similarity component 314 to compute similarity metrics between the entity and the other entities comprising the KB.

Based on the one or more determined similarity metrics, the sampling component 316 can perform one or more negative sampling analyses on the KB. In various embodiments, the sampling component 316 can generate one or more meaningful negative samples by corrupting an assertion with one or more entities from another, similar assertion. For example, sampling component 316 can replace the object entity (e.g., or subject entity and/or relation) of a first assertion, referred to hereinafter as the "original object entity," with the object entity (e.g., or subject entity and/or relation) of a second assertion, referred to hereinafter as the "replacement object entity," to generate a negative sample. Wherein the replacement object entity can be distributionally similar to the original object entity (e.g., as determined by the similarity component 314 and/or depicted in the one or more generated vector space models). For instance, one or more entities can have a similarity score greater than a predefined threshold and be considered as replacement entities (e.g., replacement object entities), wherein the respective similarity scores can be computed against the original entity (e.g., original object entity). As a result, the generated negative sample can be distributionally similar to the original assertion, which was corrupted by the sampling component 316 to generate the respective negative sample. In one or more embodiments, the one or more negative sampling analyses can be performed by the sampling component 316 in a cloud computing environment 50. Additionally, one of ordinary skill in the art will recognize that the one or more meaningful negative samples described herein can be generated by replacing respective subject entities and/or respective relations in addition to, and/or alternative to, the replacement of respective object entities described above.

Therefore, the sampling component 316 can generate one or more negative samples by corrupting one or more first assertions with one or more similar entities and/or relations of a second assertion. Similarity between the one or more entities and/or relations of the first assertions and the one or more entities and/or relations of the second assertion can be determined based on one or more vector space models (e.g., and/or serve as a measure of distributional similarity). Further, given the determined similarity, the one or more negative samples can comprise the same type of entities and/or relations as those comprising the original assertion that was corrupted (e.g., via the sampling component 316) to generate the respective negative sample. In other words, similarity (e.g., distributional similarity with respect to the KB) between the one or more generated negative samples and the one or more original assertions subject to corruption can be maximized. Thus, the one or more negative samples can be characterized as plausible false assertions; in contrast to nonsensical negative samples, which can comprise one or more entities that are incompatible with their corresponding relation within the negative sample and thereby render the negative sample demonstrably false.

Referring again to the example assertion "located in (New York City, N.Y.). An example plausible false assertion that can be generated from corrupting the example assertion (e.g., generated in accordance with one or more embodiments described herein) can be "located in (New York City, Ohio)." In this example, Ohio is a state and thereby capable of comprising cities, such as New York City; thus, the assertion is plausible. However, New York City is not located in Ohio, rather it is located in New York. Therefore, the plausible assertion is false. An example nonsensical negative sample that can be generated from corrupting the example assertion (e.g., generated using random negative sampling) can be "located in (New York City, Lunch)." In this example, a city, such as New York City, cannot be located in a lunch; thus, the assertion is nonsensical. A machine learning technology is capable of deriving more lessons and creating more accurate predictions from the plausible false assertion than the nonsensical negative sample.

Figure 4:
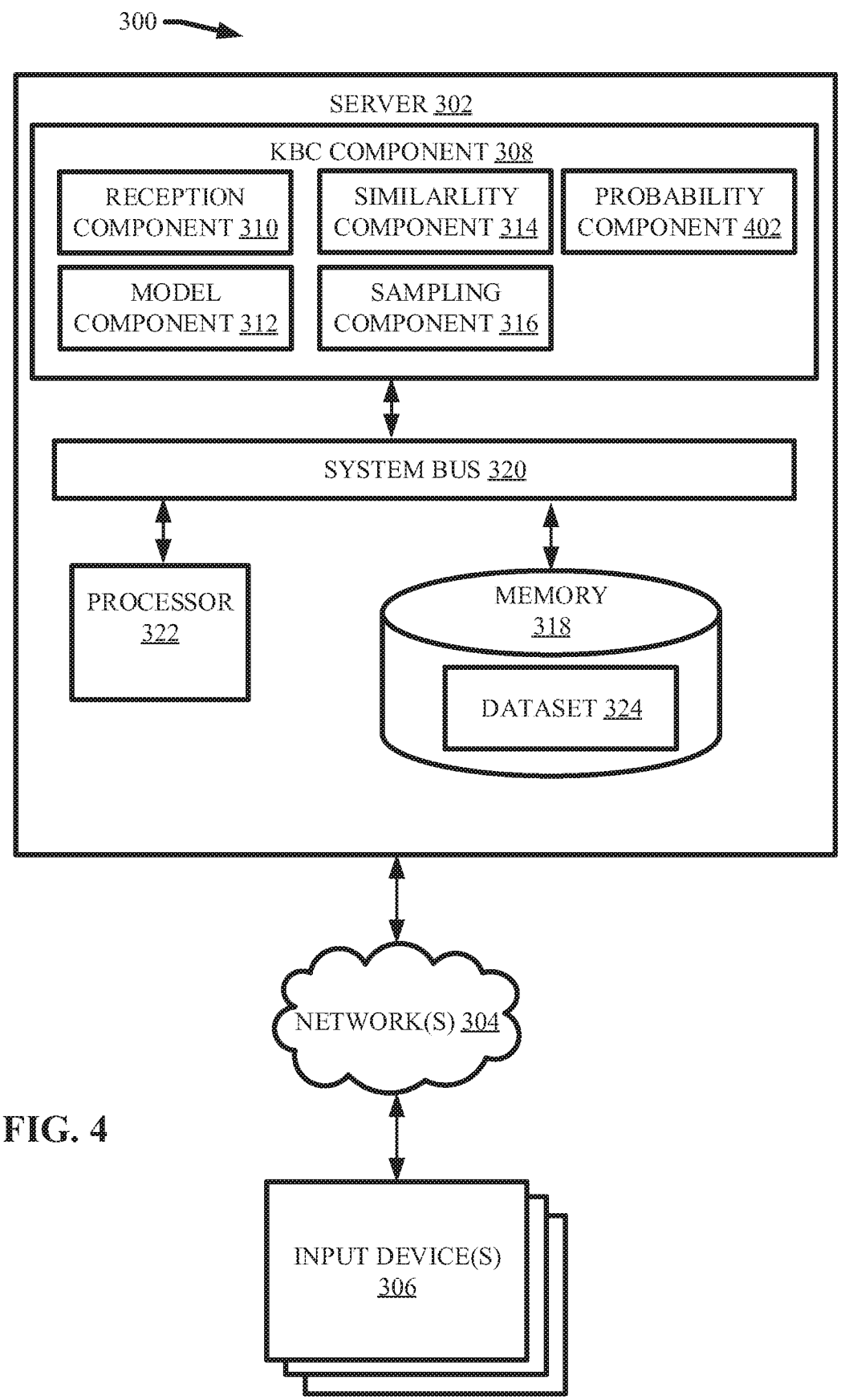
FIG. 4 illustrates a block diagram of an example, non-limiting system that can facilitate one or more similarity based negative sampling analyses in accordance with one or more embodiments described herein.

FIG. 4 illustrates a block diagram of the example, non-limiting system 300 further comprising probability component 402 in accordance with one or more embodiments described herein. Repetitive description of like elements employed in other embodiments described herein is omitted for sake of brevity. The probability component 402 can determine a probability that a corruption (e.g., performed via the sampling component 316) is likely to produce a negative sample that is false. Based on the determined probability, the probability component 402 can determine whether to utilize the subject negative sample as training data for one or more machine learning technologies. In various embodiments, the probability component 402 can determine to only utilize those generated negative samples that have a probability of falsehood greater than a predefined threshold (e.g., defined by a user of the system 300 via the one or more input devices 306). Thus, the similarity based negative analysis performed by the system 300 (e.g., KBC component 308) can generate meaningful negative samples and/or utilize meaningful negative samples that are highly likely to be false; thereby increasing accuracy of the performance.

Figure 5:
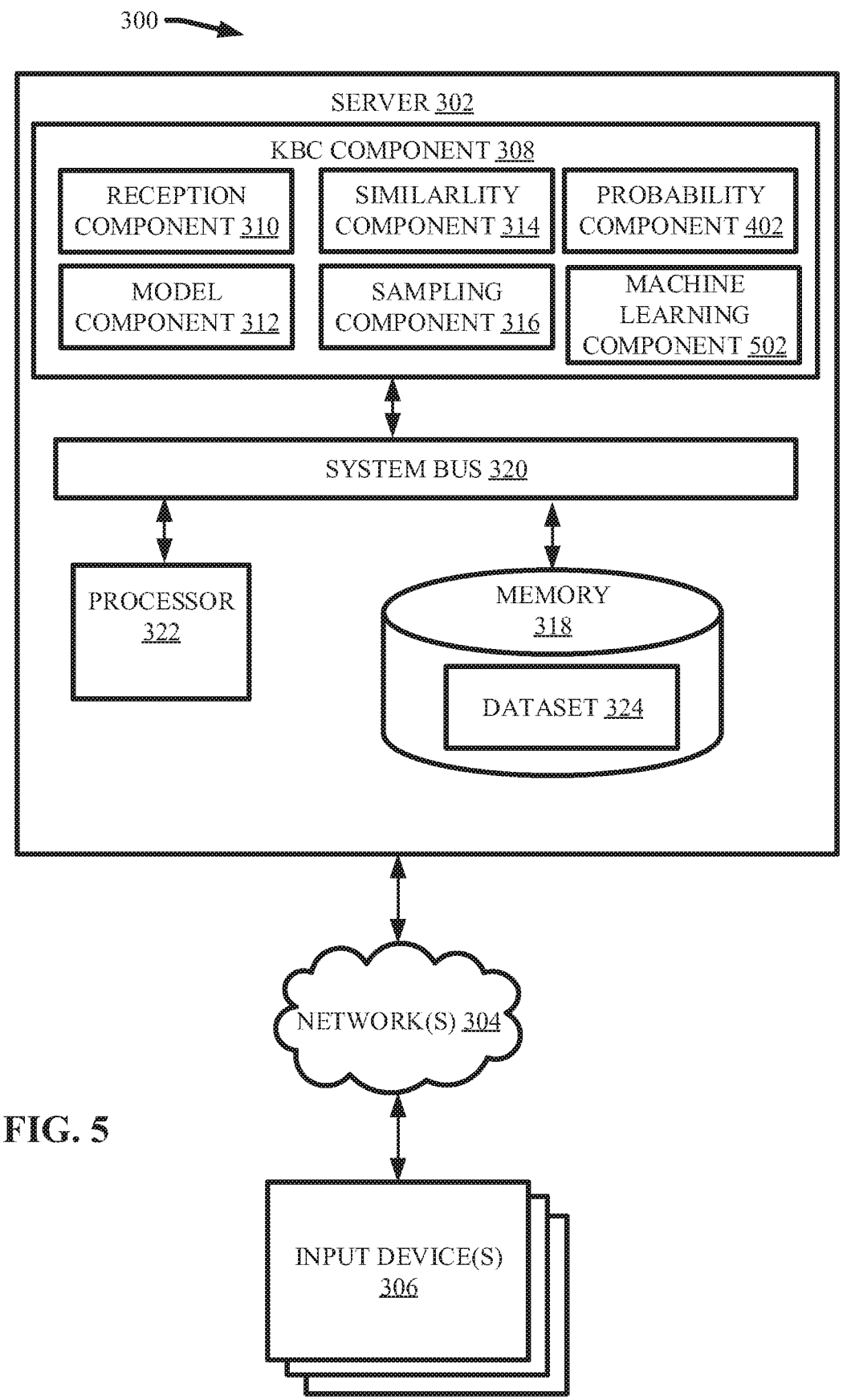
FIG. 5 illustrates a block diagram of an example, non-limiting system that can facilitate one or more similarity based negative sampling analyses in accordance with one or more embodiments described herein.

FIG. 5 illustrates a block diagram of the example, non-limiting system 300 further comprising machine learning component 502 in accordance with one or more embodiments described herein. Repetitive description of like elements employed in other embodiments described herein is omitted for sake of brevity. The machine learning component 502 can implement one or more machine learning technologies to achieve one or more autonomous tasks, such as knowledge base completion regarding a KB subject to the similarity based negative sampling analyses described herein. For example, the assertions represented by the KB can be utilized as true training data by the machine learning component 502. Additionally, the one or more negative samples (e.g., meaningful and highly likely to be false) that can be generated by the KBC component 308 can be utilized as false training data by the machine learning component 502. For instance, the machine learning component 502 can utilize one or more known KBC algorithms to compute corresponding loss values/gradients, which can be applied (e.g., via the machine learning component 502) to the subject KB. One epoch of a training algorithm can comprise the similarity based negative sampling analysis and corresponding use of generated negative samples by the machine learning component 502. Further, the KBC component 308 can perform multiple epochs (e.g., updating the KB and/or the one or more vector based models subsequent to each epoch) to derive (e.g., via the machine learning component 502) one or more lessons regarding the KB based on the assertions and/or negative samples.

FIGS. 6A-7B illustrate diagrams of example, non-limiting tables that can demonstrate the efficiency and/or efficacy of the similarity based negative sampling analysis in accordance with one or more embodiments described herein. Repetitive description of like elements employed in other embodiments described herein is omitted for sake of brevity. For example, FIGS. 6A-7B can regard an experiment performed to evaluate the efficiency and/or efficacy of the system 300.

The experiment can regard a first KB from FREEBASE® referred to as "FB15K" and a second KB referred to as "FB15KSelected," which is obtained by removing near duplicate and inverse relations from FB15K. Additionally, the experiment can use train/validation/test splits known in the art. The dataset statistics of the experiment can be shown in table 600 of FIG. 6A. Further, the experiment was performed using Mean Reciprocal Rank ("MRR"), Hits@10 and Hits@1 evaluation metrics. MRR can regard an average of the inverse of the system (e.g., system 300) generated rank while indicating true object entities and/or subject entities. Hits@10 can regard the percentages of instances where a desired objective entity and/or subject entity is ranked amongst top ten. Hits@1 can denote the accuracy of the subject system (e.g., system 300).

The following well-known KBC algorithms were utilized in the experiment: RESCAL, ProjE pointwise, and/or ProjE wlistwise. The RESCAL algorithm is historically one of the earliest algorithms for KBC to use higher order embeddings. Also, the ProjE pointwise and/or ProjE wlistwise algorithms can represent current state-of-the-art models regarding the subject datasets. The hyper-parameters used for the experiment were as follows: the embedding dimensions used was 200 for all three algorithms; the margin parameter used for the RESCAL algorithm was 10.0, while the ProjE pointwise and/or ProjE wlistwise do not make use of the margin parameter; and/or the maximum number of epochs was capped at 150 the ProjE pointwise and/or ProjE wlistwise algorithms and 1000 for the RESCAL algorithm, with early-stopping criterion set to 20 epochs.

FIG. 6B presents the results of the experiment, wherein "*" can denote the use of the similarity based negative sampling analysis in accordance with various embodiments described herein and lack of "*" can denote results obtained using typical techniques (e.g., random negative sample analysis). As shown in table 602 of FIG. 6B, the use of the similarity based negative sampling analysis in accordance with various embodiments described herein achieved better evaluation metrics than the typical techniques across all three algorithms. For example, regarding the FB15K dataset, the best MRR generated by the similarity based negative sampling analysis in accordance with various embodiments described herein surpassed typical techniques by 2.6%, and the best Hit@10 metric outperformed typical techniques by 6.0%. Similarly, the FB15KSelect dataset, the best MRR generated by the similarity based negative sampling analysis in accordance with various embodiments described herein surpassed typical techniques by 3.4%, and the best Hit@10 metric outperformed typical techniques by 1.8%.

To demonstrate how entity embeddings can be learned during training via the one or more similarity based negative sampling analyses in accordance with various embodiments described herein, learned entity embeddings were serialized after each epoch such that the nearest-neighbors can be found from the serialized embeddings. FIG. 6C shows table 604, which comprises nearest-neighbor results for a query entity "DVD" after epochs "1", "3", "5", "10", and/or "90" for the ProjE wlistwise algorithm on the FB15Select dataset. The numbers in parentheses can denote cosine-similarity. For example, an assertion represented by the subject dataset can be "film-release-distribution-medium (The Day After Tomorrow, DVD)." As shown in table 604, if the query entity DVD is replaced with entities from epoch "90", the one or more generated negative samples are likely to be meaningful and considered false according to Local Closed World Assumption ("LCWA").

For instance, considering the training scenario at epoch "90" for the example assertion "film-release-distribution-medium (The Day After Tomorrow, DVD)," the odds of choosing "VHS" as a negative object entity by the one or more similarity based negative sampling analyses in accordance with various embodiments described herein is $1.05 \times 10^{-4}$ (e.g., obtained by taking a softmax over the similarity metrics of query entity "DVD" and all other entities represented in the dataset, and returning the probability value for the entity "VHS"). In contrast, the odds of choosing "VHS" as a negative object entity by typical techniques (e.g., random negative sampling and/or domain sampling) is about $6.6 \times 10^{-5}$. Thus, the one or more similarity based negative sampling analyses in accordance with various embodiments described herein are twice as likely to generate a meaningful negative sample (e.g., "film-release-distribution-medium (The Day After Tomorrow, VHS") than typical techniques. By utilizing meaningful true/false training assertions (e.g., meaningful negative samples), as opposed to nonsensical negative samples, the system (e.g., system 300) is able to better classify validity of unknown assertions.

FIG. 7A shows table 700, which can further demonstrate the accuracy of the system of the experiment (e.g., system 300) via respective Hits@1 values. A high Hits@1 value can indicate that the subject system (e.g., system 300) can reason successfully to leverage existing assertions represented in a KB in order to generate new lessons (e.g., new assertions). The "*" can denote use of the one or more similarity based negative sampling analyses in accordance with various embodiments described herein, and lack of "*" can indicate results obtained using typical techniques (e.g., random negative sample analysis).

In addition, as compared to typical techniques (e.g., random negative sampling), the run time needed per epoch can be greater with regard to the one or more similarity based negative sampling analyses in accordance with various embodiments described herein. However, the one or more similarity based negative sampling analyses in accordance with various embodiments described herein require fewer total epochs than typical techniques to reach a parametrization corresponding to best performance on validation set. Table 702 of FIG. 7B demonstrates the overall time saving advantage (e.g., shown as "% reduction", which can indicate a percent of overall reduction of necessary time) of the one or more similarity based negative sampling analyses in accordance with various embodiments described herein (e.g., as compare to typical techniques such as random negative sampling analysis). The "*" can denote use of the one or more similarity based negative sampling analyses in accordance with various embodiments described herein, and lack of "*" can indicate results obtained using typical techniques (e.g., random negative sample analysis).

FIG. 8 illustrates a flow diagram of an example, non-limiting method 800 that can facilitate one or more similarity based negative sampling analyses in accordance with one or more embodiments describe herein. Repetitive description of like elements employed in other embodiments described herein is omitted for sake of brevity.

At 802, the method 800 can comprise determining, by a system 300 (e.g., via similarity component 314) operatively coupled to a processor 322, one or more similarity metrics for respective entities based on one or more vector space models (e.g., generated and/or populated by model component 312). The respective entities can be represented by a dataset (e.g., dataset 324), such as a KB. In various embodiments, the respective entities (e.g., object entities and/or subject entities) can be comprised within respective assertions represented by the dataset. Further, the respective assertions can comprise respective relations that can regard a relationship between entities comprising a subject assertion. As described regarding various embodiments herein, the similarity metrics determined at 802 can regard, for example, distributional similarity amongst entities and/or relations comprised within the dataset. For example, the similarity metrics can be cosine-similarity metrics.

At 804, the method 800 can comprise performing, by the system 300 (e.g., via the sampling component 316), a negative sampling analysis on the dataset based on the similarity metrics determined at 802. As described regarding various embodiments herein, the negative sampling analysis performed at 804 can generate one or more negative sample assertions characterized by a high level of similarity with an original assertion from the dataset used to form the subject negative sample assertion. The one or more negative sample assertions generated at 804 can be plausible assertions with a high likelihood of being false. Forming the one or more negative sample assertions can comprise replacing an entity and/or relation of a first assertion represented in the dataset with another entity and/or relation of a second assertion represented in the dataset. Further, the entity and/or relation of the first assertion can have a high level of similarity with the entity and/or relation of the second assertion as denoted by the respective similarity metrics determined at 802. Thus, the negative sampling analysis performed at 804 can be similarity based and can generate one or more negative sample assertions that can be characterized as having maximum similarity with an original assertion that was subject to corruption while also having a high likelihood of falsehood.

Figure 9:
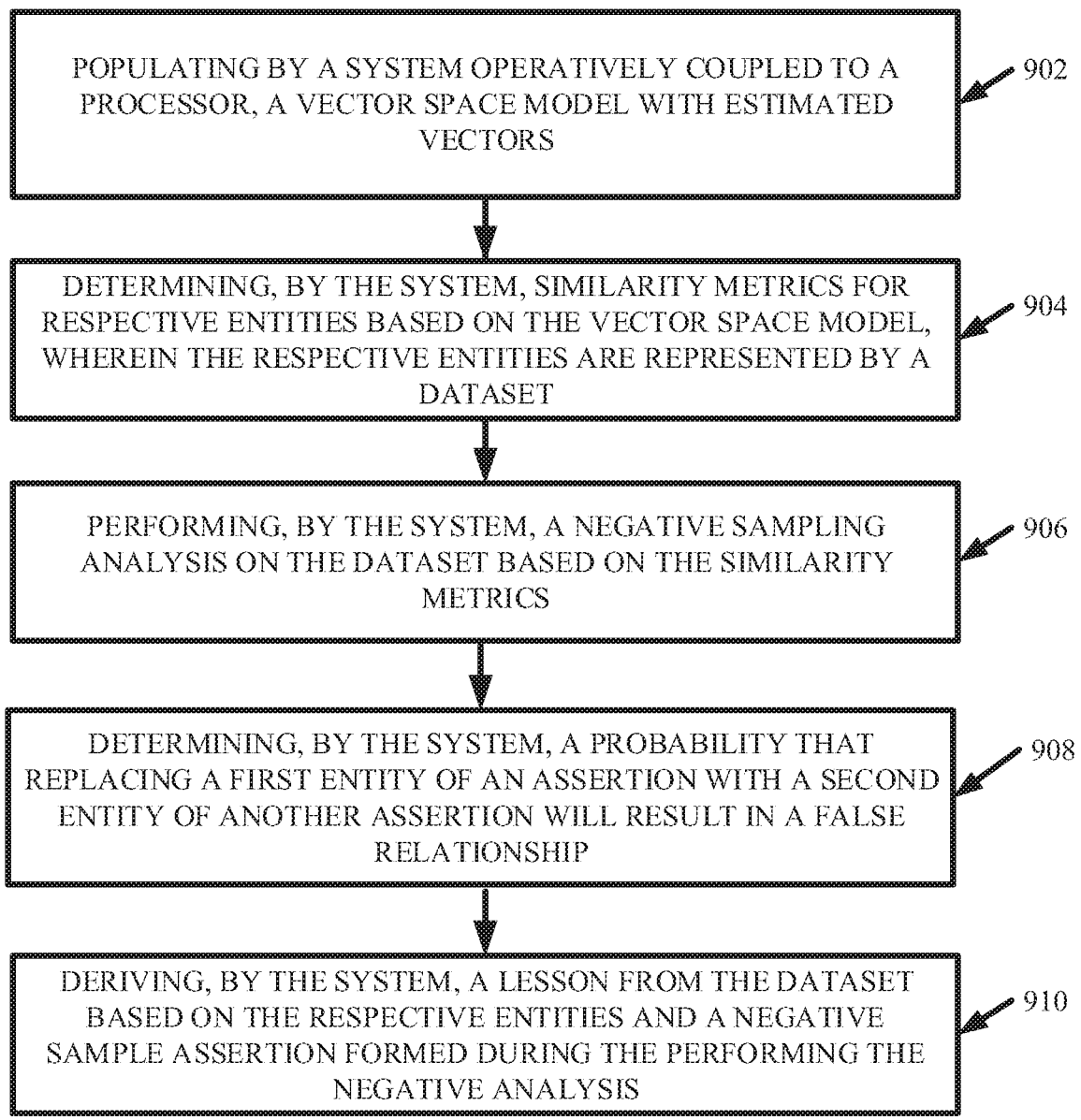
FIG. 9 illustrates a flow diagram of an example, non-limiting method that can facilitate one or more similarity based negative sampling analyses in accordance with one or more embodiments described herein.

FIG. 9 illustrates a flow diagram of an example, non-limiting method 800 that can facilitate one or more similarity based negative sampling analyses in accordance with one or more embodiments describe herein. Repetitive description of like elements employed in other embodiments described herein is omitted for sake of brevity.

At 902, the method 900 can comprise populating, by a system 300 (e.g., via model component 312) operatively coupled to a processor 322, one or more vector space models with estimated vectors. As described regarding various embodiments herein, the estimated vectors can be associated with respective entities (e.g., object entities and/or subject entities) and/or relations comprised within respective assertions represented by a dataset (e.g., dataset 324), such as a KB. The respective relations that can regard a relationship between entities comprising a subject assertion. The one or more vector space models can be generated and/or populated (e.g., by the model component 312) using, for example, deep learning algorithms.

At 904, the method 900 can comprise determining, by the system 300 (e.g., via similarity component 314), one or more similarity metrics for respective entities based on the one or more vector space models populated at 902 (e.g., by model component 312). As described regarding various embodiments herein, the similarity metrics determined at 904 can regard, for example, distributional similarity amongst entities and/or relations comprised within the dataset. For example, the similarity metrics can be cosine-similarity metrics.

At 906, the method 800 can further comprise performing, by the system 300 (e.g., via the sampling component 316), a negative sampling analysis on the subject dataset based on the similarity metrics determined at 904. As described regarding various embodiments herein, the negative sampling analysis performed at 906 can generate one or more negative sample assertions characterized by a high level of similarity with an original assertion from the dataset used to form the subject negative sample assertion. The one or more negative sample assertions generated at 906 can be plausible assertions. Forming the one or more negative sample assertions can comprise replacing a first entity and/or relation of a first assertion represented by the dataset with a second entity and/or relation of a second assertion represented by the dataset. Further, the entity and/or relation of the first assertion can have a high level of similarity with the entity and/or relation of the second assertion as denoted by the respective similarity metrics determined at 904. Thus, the negative sampling analysis performed at 906 can be similarity based and can generate one or more negative sample assertions that can be characterized as having maximum similarity with an original assertion that was subject to corruption.

At 908, the method 900 can comprise determining, by the system 300 (e.g., via the probability component 402), a probability that replacing the first entity and/or relation of the first assertion with the second entity and/or relation of the second assertion will result in a false relationship. In other words, at 908 the method 900 can comprise determining a probability that the one or more negative sample assertions generated at 906 will be false assertions. As described regarding various embodiments herein, the probability component 402 can screen the one or more generated negative sample assertions to ensure that only those with a high probability of falsehood are utilized as training data in one or more machine learning technologies.

At 910, the method 900 can also comprise deriving, by the system (e.g., via the machine learning component 502), one or more lessons from the dataset based on the respective entities and the one or more negative sample assertions having a high probability of falsehood. As described regarding various embodiments herein, the machine learning component 502 can utilize one or more machine learning technologies in conjunction with one or more KBC algorithms to derive the one or more lessons.

Figure 10:
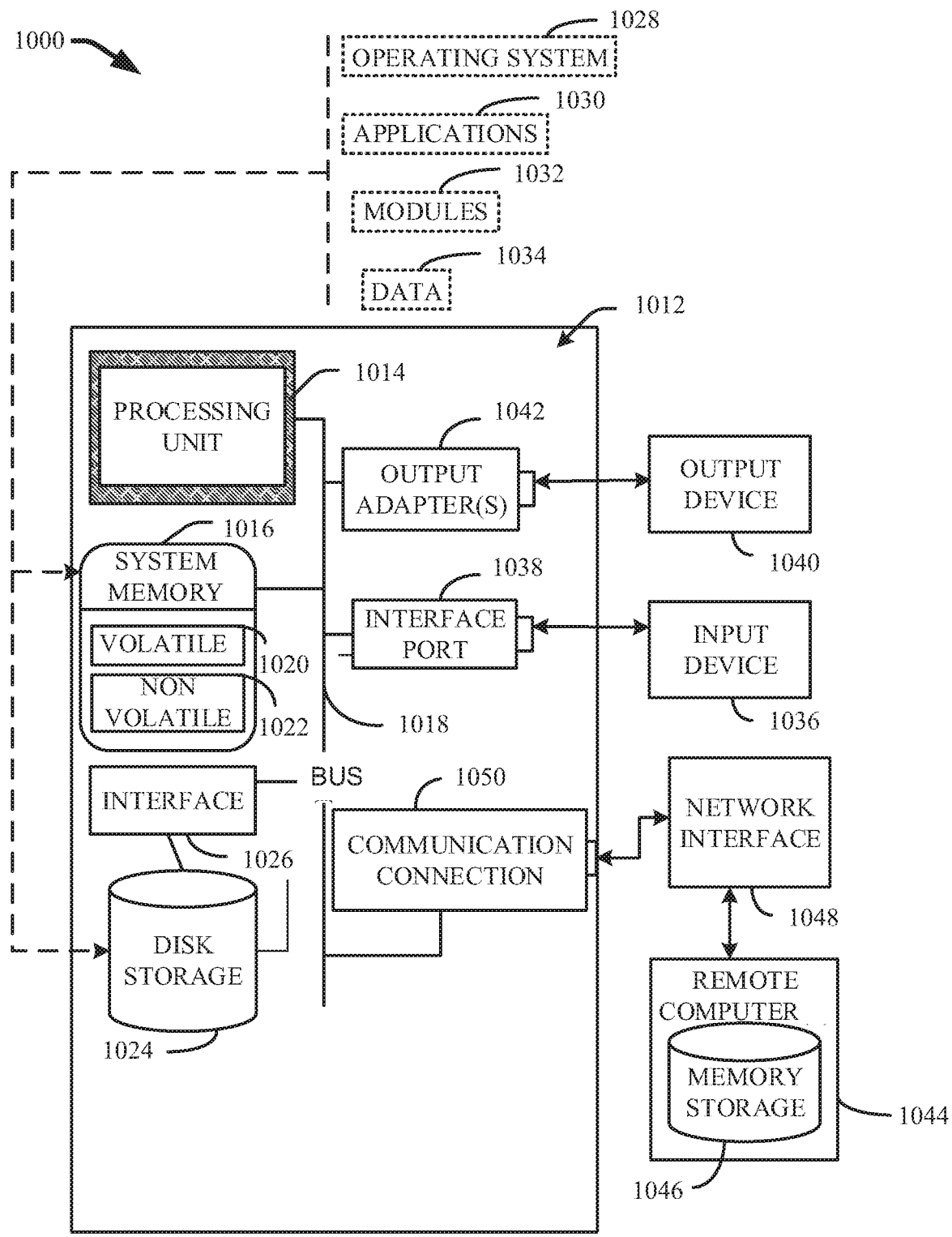
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor, operably coupled to the memory, and that executes the computer executable components stored in the memory, wherein the computer executable components comprise:
a similarity component that determines respective similarity scores of a similarity metric between entities of a dataset based on a vector space model; and
a sampling component that generates training data to train a machine learning model to predict whether a query assertion regarding the dataset is true or false, wherein the training data comprises a positive sample assertion, and a negative sample assertion generated from the positive sample assertion based on performing a negative sampling analysis on the dataset based on the similarity scores, comprising:
wherein the positive sample assertion comprises a first entity of the dataset, a second entity of the dataset, and a defined relationship between the first entity and the second entity, wherein the defined relationship is true, and
substituting the first entity of the positive sample assertion with a third entity of the dataset to generate the negative sample assertion, wherein the third entity has a similarity score for the similarity metric with respect to the first entity exceeding a predefined threshold, the defined relationship is false between the second entity and the third entity, and the first entity, the second entity, and the third entity are distinct.

2. The system of claim 1, wherein the sampling component generates a plurality of negative sample assertion from a plurality of positive sample assertions based on performing the negative sampling analysis.

3. The system of claim 2, further comprising:
a probability component that determines a probability that replacing the first entity with the third entity will result in the defined relationship between the second entity and the third entity being false.

4. The system of claim 1, further comprising:
a model component that populates the vector space model with respective estimated vectors for the entities using a deep learning algorithm.

5. The system of claim 1, wherein the similarity metric is a type of metric selected from a group consisting of a cosine metric, an euclidean metric, and a manhattan metric.

6. The system of claim 1, further comprising:
a machine learning component that derives, using the machine learning model, a lesson from the dataset based on the entities and the negative sample assertion.

7. The system of claim 1, wherein the memory is comprised within a cloud computing environment.

8. A computer-implemented method, comprising:
determining, by a system operatively coupled to a processor, respective similarity scores of a similarity metric between entities of a dataset based on a vector space model; and
generating, by the system, training data to train a deep learning algorithm to predict whether a query assertion regarding the dataset is true or false, wherein the training data comprises a positive sample assertion, and a negative sample assertion generated from the positive sample assertion based on performing a negative sampling analysis on the dataset based on the similarity scores, comprising:
wherein the positive sample assertion comprises a first entity of the dataset, a second entity of the dataset, and a defined relationship between the first entity and the second entity, wherein the defined relationship is true, and
substituting the first entity of the positive sample assertion with a third entity of the dataset to generate the negative sample assertion, wherein the third entity has a similarity score for the similarity metric with respect to the first entity exceeding a predefined threshold, the defined relationship is false between the second entity and the third entity, and the first entity, the second entity, and the third entity are distinct.

9. The computer-implemented method of claim 8, wherein the generating further comprises generating a plurality of negative sample assertion from a plurality of positive sample assertions based on performing the negative sampling analysis.

10. The computer-implemented method of claim 8, further comprising:
determining, by the system, a probability that replacing the first entity with the third entity will result in the defined relationship between the second entity and the third entity being false.

11. The computer-implemented method of claim 8, further comprising:
populating, by the system, the vector space model with respective estimated vectors for the entities using the deep learning algorithm.

12. The computer-implemented method of claim 8, wherein the similarity metric is a type of metric selected from a group consisting of a cosine metric, an euclidean metric, and a manhattan metric.

13. The computer-implemented method of claim 8, further comprising:
deriving, by the system, using the deep learning algorithm, a lesson from the dataset based on the entities and the negative sample assertion.

14. A computer program product for similarity based negative sampling, the computer program product comprising a computer readable storage medium having program instructions embodied therewith, the program instructions executable by a processor to cause the processor to:
determine, by the processor, respective similarity scores of a similarity metric between entities of a dataset based on a vector space model; and
generate, by the processor, training data to train a neural net to predict whether a query assertion regarding the dataset is true or false, wherein the training data comprises a positive sample assertion, and a negative sample assertion generated from the positive sample assertion based on performing a negative sampling analysis on the dataset based on the similarity scores, comprising:
wherein the positive sample assertion comprises a first entity of the dataset, a second entity of the dataset, and a defined relationship between the first entity and the second entity, wherein the defined relationship is true, and
substituting the first entity of the positive sample assertion with a third entity of the dataset to generate the negative sample assertion, wherein the third entity has a similarity score for the similarity metric with respect to the first entity exceeding a predefined threshold, the defined relationship is false between the second entity and the third entity, and the first entity, the second entity, and the third entity are distinct.

15. The computer program product of claim 14, wherein the generating further comprises generating a plurality of negative sample assertion from a plurality of positive sample assertions based on performing the negative sampling analysis.

16. The computer program product of claim 15, wherein the program instructions further cause the processor to:
determine, by the processor, a probability that replacing the first entity with the third entity will result in the defined relationship between the second entity and the third entity being false.

17. The computer program product of claim 15, wherein the program instructions further cause the processor to:
populate, by the processor, the vector space model with respective estimated vectors for the entities using a deep learning algorithm.

18. The computer program product of claim 15, wherein the similarity metric is a type of metric selected from a group consisting of a cosine metric, an euclidean metric, and a manhattan metric.

19. The computer program product of claim 15, wherein the program instructions further cause the processor to:
derive, by the processor, using the neural net, a lesson from the dataset based on the entities and the negative sample assertion.

20. The computer program product of claim 15, wherein the processor performs the negative sampling analysis in a cloud computing environment.

* * * * *